United States Patent [19]

Griest

[11] 4,286,009
[45] Aug. 25, 1981

[54] COMPOSITE SOLAR ABSORBER COATINGS

[75] Inventor: Edward M. Griest, Big Flats, N.Y.

[73] Assignee: Corning Glass Works, Corning, N.Y.

[21] Appl. No.: 99,902

[22] Filed: Dec. 3, 1979

Related U.S. Application Data

[63] Continuation of Ser. No. 878,225, Feb. 16, 1978, abandoned.

[51] Int. Cl.$^3$ .............................................. B32B 15/00
[52] U.S. Cl. .................... 428/212; 126/901;
427/108; 427/109; 427/110; 427/160; 427/162;
428/432; 428/913; 428/697; 428/701
[58] Field of Search ............... 428/359, 432, 389, 384,
428/212; 126/901; 427/108–110, 160, 162

[56] References Cited

U.S. PATENT DOCUMENTS

| | | | |
|---|---|---|---|
| 2,564,677 | 8/1951 | Davis | 427/110 |
| 2,567,331 | 9/1951 | Gaiser et al. | 427/110 |
| 3,202,054 | 8/1965 | Mochel | 428/215 |
| 3,473,944 | 10/1969 | Dates | 428/539 |
| 3,959,565 | 5/1976 | Jordan et al. | 427/424 |
| 3,981,293 | 9/1976 | Gillery | 126/901 |
| 3,991,228 | 11/1976 | Carlson et al. | 427/109 |

Primary Examiner—George F. Lesmes
Assistant Examiner—E. Rollins Buffalow
Attorney, Agent, or Firm—John P. DeLuca

[57] ABSTRACT

There has been provided composite coatings for solar absorber surfaces wherein solar radiation impinges on one surface of the absorber and which absorber is adapted to transfer energy so received from the impinging solar radiation in the form of sensible heat to a working fluid in contact with a delivery surface therewith comprising: a smooth surface absorber substrate having a first coating of metal oxides deposited on the smooth layer which oxides are selected from the group, consisting essentially of tin, antimony, indium and iron, and a second coating of metal oxides deposited on the first coating selected from the aforementioned group for said first layer; said first and second coatings disposed so as to exhibit a relatively high absorption characteristic $\alpha$ of at least 0.85 in the solar wavelength range, and a relatively low emissivity characteristic $\epsilon$ of less than 0.2 within the wavelength range of the infrared greater than about 2 micrometers.

7 Claims, 4 Drawing Figures

COMPOSITE SOLAR ABSORBER COATINGS

This is a continuation of application Ser. No. 878,225, filed Feb. 16, 1978 now abandoned.

BACKGROUND OF INVENTION

The present invention relates to solar energy collection and in particular to coatings for producing selective absorber surfaces.

A wide variety of solar collectors are presently available, which collectors may be classified into three major types. The first and essentially simplest type of collector is that of the non-tracking flat plate type, which consists essentially of a flat absorber panel enclosed in a collector housing having a window over the absorber, which structure is oriented towards the sun and usually remains fixed in position. This type of structure may be movable for adjustments during the solar year but for the most part it normally remains stationary during any particular period of collection, e.g., day, month, season or year. Another type of collector is that using an evacuated tube or tubes which surrounds an absorber surface. This type of collector normally is in a fixed position for a particular collection period as mentioned above but it has the advantage of having an evacuated space for reducing convection and conduction losses from the absorber surface. Yet another type of solar collector is the concentrating type which may include a flat plate or evacuated tubular collector located at a concentrating zone or focus of appropriate concentrating apparatus. The collector may be of the fixed type which has a relatively low concentration ratio, a wide acceptance angle for relatively long periods of the solar day and may require little or no tracking. On the other hand, the most sophisticated and expensive of the concentrating collectors are those having a relatively narrow acceptance angle with high concentration and which consequently require tracking over the entire period of the solar day.

Each of the aforementioned types of collectors serves a specific market. For example the non-tracking flat plate collector serves the domestic hot water and heating market, whereas the evacuated tubular type, whether fixed or partially tracking, may be used to produce hot water, heat and air conditioning. Finally, the highly concentrating tracking collectors may be utilized for the production of high temperature working fluid for power generation. It should be realized that each of the systems has constraints which are rather severe and that substantial cost reduction must be realized in order to economically justify a solar collector installation as an alternative to other sources.

To this end a spectrally selective absorber coating is an essential component of most efficient collector designs. Existing coatings, although quite efficient, as evidenced by high absorptivity $\alpha$ and low emissivity $\epsilon$, are very expensive. Exotic and expensive materials such as indium, gold and silver compounds are sometimes used to produce spectrally selective absorber surfaces. Considering the square footage requirements of absorber surfaces which are necessary to compete with just the domestic hot water and heating alternatives, such exotic and expensive materials are not economically attractive.

It has been found that some films of metal oxides, when combined in proper juxtaposition, provide useful selective absorber surfaces, which surfaces are valuable improvements in the selective absorber technology, since they can be produced in large quantities at reasonable costs.

The type of surface contemplated by the present invention is one in which the absorptivity $\alpha$ is measured in the visible and near visible wavelengths of solar radiation from about 0.2 micrometers to about 2 micrometers, and the emissivity $\epsilon$ is measured in a range of the infrared and near infrared domain from about 2 micrometers to about 20 micrometers.

It is known that certain coatings for absorbers exhibit selectivity, in that they are opaque to incident solar radiation but on the other hand are transparent to infrared. For example, black chrome on copper has been found to absorb in the range of visible radiation with an absorptivity of 0.9 and the polished copper substrate "looks through" the black coating to reflect infrared radiation.

A rather comprehensive summary of some of the problems and phenomenon discovered in connection with selected coatings is discussed by Seraphin in an article entitled *Converting Solar Radiation to Heat:Challenges to Optical Material Science*, published in Optical Science Center Newsletter 10, No. 1, 1976, University of Arizona, Tuscon. Absorber-reflector tandems are discussed in that article wherein two basic configurations are described as follows: (1) heat mirrors, wherein the reflector intercepts the sunlight first, and are characterized by highly doped semiconductors such as indium oxide, tin oxide or cadmium stannate, which are highly reflective in the thermal infrared but are transparent to the incident solar energy; (2) absorber reflector configuration, wherein the absorber is transparent to longer wavelengths so that the reflector can "look through" and suppress the emittance in the thermal infrared. Other types of absorbers are discussed such as semiconductor absorbers and those having various controlled refractive indexes.

Nozic et al. in U.S. Pat. No. 3,987,781 discusses the use of a cadmium stannate electrically conductive coating which suppresses infrared radiation. Gillory in U.S. Pat. No. 3,981,293 discusses a figure of merit for absorption and reflection in a solar collector for a heat mirror window. Mochel, on the other hand, discusses in his U.S. Pat. No. 3,202,054 the use of multiple coatings for reflecting infrared radiation to suppress the heat buildup in a building due to incident sunlight. Similarly Dates in U.S. Pat. No. 3,473,944 describes a heat reflecting glass panel which reflects a substantial portion of radiation throughout the visible spectrum and also absorbs a certain amount of radiation so as to both prevent glare and permit the viewing of objects therethrough without color distortion. None of the aforementioned references show the arrangement of specially formulated coatings for a solar absorber as described herein.

It has been found that tin, indium and certain iron oxide coatings when combined in a tandem arrangement can act as both an absorber and as an infrared mirror, which coatings are relatively easy to apply to a substrate such as glass. On the one hand, tin oxide films have been used for infrared mirrors, but have not as yet been formed as effective absorbers. Iron oxide, however, has been found to be a reasonably good absorber but a poor infrared reflector.

The present invention seeks to utilize the materials set forth above in a manner which is an improvement over the described prior arrangements, since the materials serve a dual function of exhibiting high absorptivity in the visible range and good infrared reflectivity in the desired infrared range.

SUMMARY OF INVENTION

There has been provided composite coatings for solar collector absorber surfaces wherein solar radiation impinges on one surface of the absorber, which absorber is adapted to transfer energy so received from the impinging solar radiation in the form of sensible heat to a working fluid in contact with a delivery surface thereof comprising: a smooth surface absorber substrate having a first coating of metal oxides deposited on the smooth layer, which oxides are selected from the group consisting essentially of tin, antimony, indium and iron; and a second coating of metal oxides deposited on the first layer selected from the aforementioned group for said first layer; said first and second coatings deposited so as to exhibit a relatively high absorption characteristic $\alpha$ of at least 0.85 in the solar wavelength range of less than about 2 micrometers, and a relatively low emissivity characteristic $\epsilon$ of less than 0.2 within the wavelength range of the infrared greater than about 2 micrometers.

DESCRIPTION OF THE PREFERRED EMBODIMENT

Figure 1:
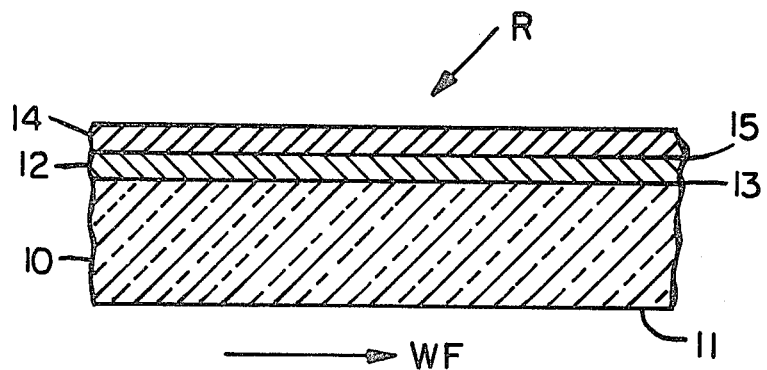
FIG. 1 is a greatly enlarged cross sectional view illustrative of a substrate material coated with the composite coating of the present invention, which substrate may form part of an absorber surface for various types of the solar collectors described herein.

In the drawing there is illustrated a substrate material 10, preferably glass, which has a delivery surface 11 disposed to be in contact with a working fluid WF, and another surface 13 disposed so as to face impinging radiation R. Deposited on the surface 13 of the substrate 10 is a first coating 12 which as hereinafter described, may be either a highly absorbent black body type coating, or a highly reflective infrared coating. The differences will be explained further in the discussion. Disposed in tandem on the first coating 12 is a second coating 14, which will exhibit properties opposed to that of the coating 12. In other words the coating 14 will be an absorber when the coating 12 is a reflector and vice versa. The reason for this is that in one case when the coating 14 is an infrared mirror and may be transparent to the visible portion of radiation R, that is in the wavelength range from about 0.2 to about 2 micrometers, and opaque to radiation of longer wavelengths up to about 20 micrometers, the coating 12 is virtually opaque to radiation in the aforementioned visible range and highly absorbent thereof. From this it can be realized that the impinging radiation R passes through the coating 14 and is absorbed by the coating 12, converted to a longer wavelength energy, and transferred by conduction through the substrate 12 to delivery surface 11 which is in contact with the working fluid WF as shown. The longer wavelength radiation, longer than 2 micrometers, is reflected from the interface 15 between the coatings 12 and 14 towards the coating 12 and substrate 10.

In a variation of the tandem coating arrangement, the surface 14 may be of a selected material which is opaque to visible radiation (i.e. an absorber) and transparent to infrared. The coating 12, on the other hand, would then be a suppressor of infrared radiation greater than 2 micrometers, and can "look through" the coating 14 to suppress radiation from the substrate 10, which radiation is transferred thereto by the conduction through the various coatings 14 and 12.

To illustrate the principles of the invention described herein the following examples are disclosed.

EXAMPLE 1

| | | | $\alpha$ | $\epsilon$ |
|---|---|---|---|---|
| (A) | (i) Top Coating (14) | | | |
| | Spray solution composition: | | | |
| | $\dfrac{SbCl_3}{(SbCl_3 + SnCl_4 \cdot 5H_2O)} = .10$ | | | |
| | (ii) Bottom coating (12) | | | |
| | Spray solution composition: | | | |
| | $\dfrac{SbCl_3}{(SbCl_3 + SnCl_4 \cdot 5H_2O)} = .01$ | | | |
| | | | .87 | .59 |
| (B) | (i) Top coating (14) | | | |
| | .01 solution from above | | | |
| | (ii) Bottom coating (12) | | | |
| | .10 solution from above | | .92 | .17 |

In Example 1 above, it is clear that tin oxide coatings which have hereinbefore been most useful as low emissivity infrared suppressing coatings, may be combined with an antimony dopant to produce a highly absorbing coating as the antimony approaches approximately 10% by weight of the solution. The tin oxide coating may be used in combination with a magnetite coating (see Example 2 below), which is relatively easy to produce with an absorptivity greater than 0.85 and an emissivity less than 0.2.

EXAMPLE 2

| | | Magnetite-tin oxide coatings | $\alpha$ | E |
|---|---|---|---|---|
| (A) | (i) | Top coating (14) | | |
| | | .01 solution from Example 1 (A)(ii) | | |
| | (ii) | Bottom coating (12) | | |
| | | $Fe_3O_4$ | .88 | .19 |
| (B) | (i) | Top coating (14) | | |
| | | $Fe_3O_4$ | | |
| | (ii) | Bottom coating (12) | | |
| | | .01 solution from Example 1 (A)(ii) | .87 | .34 |

EXAMPLE 3

To 7.0 ml of $SnCl_4$ solution (1.40 gm $SnCl_4.5H_2O$/ml in 1.5 HCl) was added 1.5 ml of 24.6% HF (49.2% HF diluted 1:1 in propanol-2). The solution was sprayed on a plate preheated to 650° C. The resulting film produces an emissivity $\epsilon$ of 0.11.

Thus the coating of this Example 3 may be substituted for top coating 14 in Examples 1 and 2.

In composite selective absorber films such as the one described in Examples 1 and 2, the overall performance is improved as the emissivity $\epsilon$ of the top coating 14 is decreased, thus substitution of tin-doped indium oxide for antimony-doped tin oxide will improve the selective absorption efficiency of the composite coating. However, the much higher cost of $InCl_3$ as compared to SnCl$_4$ mitigates against its commercial use in this application where low cost is critical to successful development. A substantial reduction in indium salt consumption can be achieved by use of a relatively thin coating of indium-tin oxide deposited over a layer of the inexpensive tin-antimony oxide material.

EXAMPLE 4

A solution was prepared by adding 2.2 ml of SnCl$_4$ (0.10 gm/ml in EtOAc) to 14.0 ml of InCl$_3$ (0.50 gm/ml in EtOAc). This stock solution was diluted progressively and a 5 ml quantity sprayed on Corning Code 7059 plates preheated to 650° C. The effect of dilution and base coating 12 on emissivity is shown in the following table:

| Top Coating 14 ml In/Sn Soln. | | ml EtOAc | Bottom Coating Absent | Bottom Coating Aii of Ex. 1 |
|---|---|---|---|---|
| 100% | 5 | 0 | .19 | .10 |
| 80% | 4 | 1 | .19 | .11 |
| 60% | 3 | 2 | .21 | .10 |
| 40% | 2 | 3 | .28 | .13 |
| 20% | 1 | 4 | .43 | .19 |

Thus the amount of the expensive indium salt required can be reduced to about 40% of initial concentration without sacrifice of optical characteristics.

In Example 4 above, it was found that the use of tin doped indium oxide for top coating 14 provided a reasonably low emissivity when diluted, so that it is clear that a very low percentage of indium salts are used to form the coating material. However the emissivity of the top coating 14 was substantially improved when the bottom coating 12 of 10% antimony doped tin oxide was used, which coating is described in Example 1, i.e., the 0.1 solution.

EXAMPLE 5

Forming gas (92%N$_2$-8%H$_2$) at 100 cc/min was bubbled into Fe(CO)$_5$ at room temperature, the resulting vapor stream diluted with forming gas at 1000 cc/min and then contacted with a glass substrate 10 preheated to 210° C. The initial deposit 12 was a highly reflective, metallic-appearing film while on continued reaction, a black smokey layer 14 formed over the base coating 12. Measurement of optical properties showed a solar absorptance of 0.93 and infra-red emissivity of 0.08.

(ESCA) analysis of the coatings revealed that the ratio of Fe/O was a minimum of 1.6:1 which is higher than magnetite (Fe$_3$O$_4$ at 0.75:1). Scanning electron microscope (SCM) photos revealed a shiny bottom coating 12 and dull black rough top coating 14. It appears as if from this arrangement of composite coatings the absorbing property is exhibited by the rough surface quality of the top coating 14. The bottom coating 12 "looks through" the top coating 14 to suppress infrared emission.

EXAMPLE 6

Data, illustrating the effect of film thickness, in terms of volume and composition, on reflectivity as measured on a Gier-Dunkle DB-100 infrared reflectometer is displayed below.

Temp. —675° C.
Total spray volume adjusted to 70 cc with 1:4 HCl
Emissivity ($\epsilon$) = 1 − (reflectivity)
From Ex 1Ai Sb/Sn=0.10
From Ex 1Aii Sb/Sn=0.01

| Spray Volume ml. | | Reflectivity (1 − $\epsilon$) | | |
|---|---|---|---|---|
| Sb/Sn .10 | .01 | .10 | .01 | Duplex |
| 6.4 | 6.4 | .277 | .783 | .825 |
| 3 | 5 | 214 | 786 | 809 |
| 3.6 | 3.6 | 212 | 745 | 775 |
| .5 | 5 | 263 | 778 | 818 |
| 3.6 | 6.4 | 221 | 793 | 821 |
| 7 | 5 | 309 | 780 | 824 |
| 5 | 7 | 256 | 802 | 826 |
| 5 | 5 | 257 | 786 | 814 |
| 6.4 | 3.6 | 295 | 749 | 800 |
| 5 | 3 | 267 | 713 | 774 |
| 5 | 5 | 264 | 784 | 818 |

Figure 2:
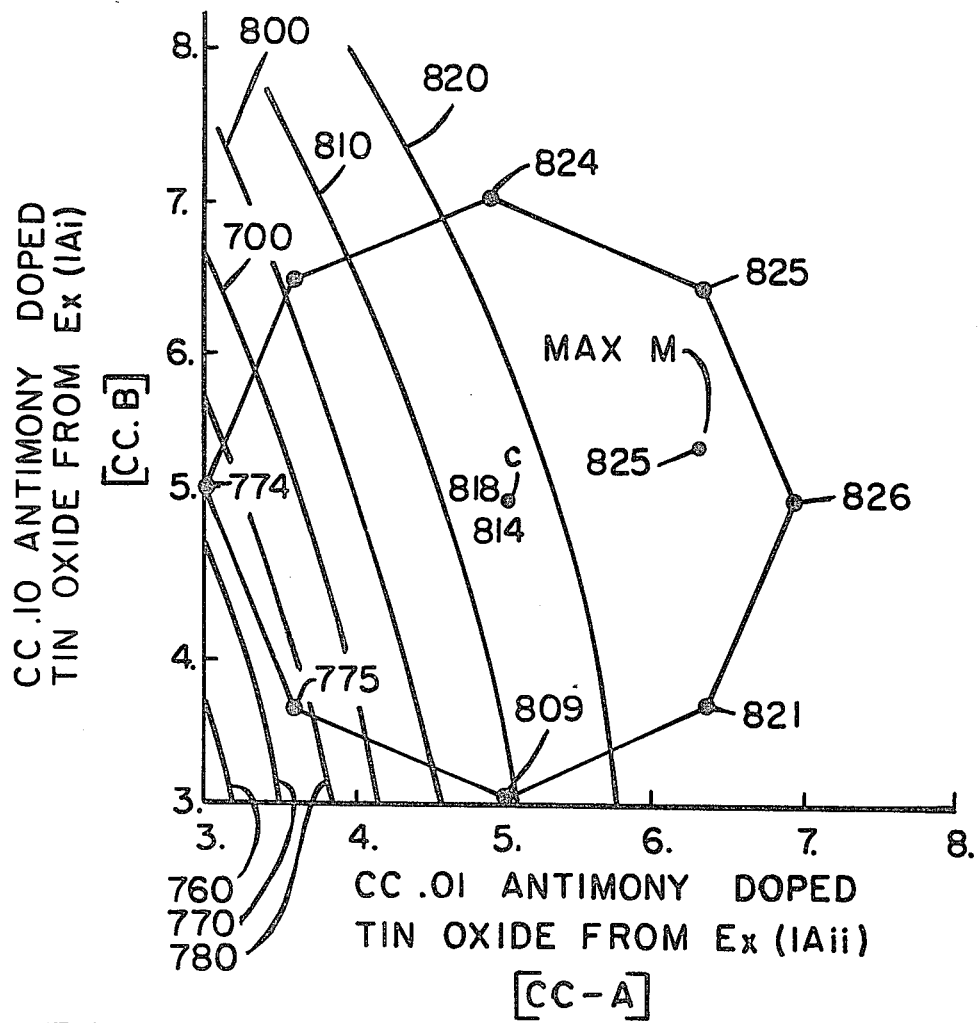
FIG. 2 is a plot of data for Example 6 set forth hereinafter, illustrating an advantageous result of thin coatings.

The data for Example 6 shows an interaction between the absorber coating 12 (0.10 antimony dopant coating of Example 1) and reflectance (i.e. R = 1 − $\epsilon$) of coating 14 (0.01 antimony dopant coating of Example 1) yielding a higher reflectivity (lower $\epsilon$) at a given film thickness than the 0.01 antimony dopant coating of Example 1 alone. This would be economically advantageous since the absorber coating 12 thickness must be a minimum value to function efficiently. It would at the same time minimize the thickness of enhancing coating 14 clearly reducing film thickness thus reducing the materials requirements and not only reduce cost but in this case increase the effective reflectivity of the solar absorber illustrated in the drawing of FIG. 1. FIG. 2 illustrates a plot of the data of Example 6, of film thickness of 0.10 antimony dopant of Example 1 Ai; (absorber 12) vs. 0.01 antimony dopant of Example 1 Aii; (reflector 14) with R reflectivity as a dependent variable. For the data of Example 6, the following expression has been found to describe the relation of film thickness to reflectivity R.

R = 544.0 + 19.5[A] + 72.0[B] − 3.06[A][B] − 4.359[A]$^2$ with the square of correlation coefficient equal to 0.99.

A and B are the volumes of 0.10 and 0.01 antimony doped tin chloride solutions from Example 1Ai and 1Aii respectively.

The data points from the above calculation show a maximum (M) for the expression at 0.825 where indicated. The area within FIG. 16 indicates acceptable reflectivity for various combinations of film thickness measured in terms of volume. (See Table I below.) Lines 760 ... 820 show the scale for the values of reflectivity (R × 1000) selected in the drawing. The center point C illustrates the repeatable error for a group of readings.

Coating thickness is measured approximately in terms of spray volume. Table I shows the approximate relation of the coating thickness in Angstrom units versus spray volume in CC. on an enclosed heated one inch square.

TABLE I

| Spray Vol. CC. | Thickness Å |
|---|---|
| 3.0 | 1750 |
| 3.6 | 2100 |
| 5.0 | 2800 |
| 6.4 | 3750 |

From the above table it is clear that reducing the spray volume by more than half does not cause a corresponding linear reduction in coating thickness. If thickness requirements can be reduced by improvements in the coating composition the total material requirements can be significantly reduced.

For example, in Example 3 above, the emissivity of the coating illustrated in Example 1, namely the 0.01 solution antimony-doped tin oxide was improved by the use of fluorine in the coating thereby significantly reducing both materials cost and volume requirements.

EXAMPLE 7

| Reflectivity R. | ml. 49% HF/10 ml. Base Solution |
|---|---|
| .852 | .32 |
| .888 | .58 |
| .893 | .82 |
| .894 | .82 |
| .896 | 1.12 |
| .892 | 1.52 |
| .888 | 2.00 |
| .885 | 2.52 |

Base solution 9.5 ml (1.40 gm $SnCl_4 \cdot 5H_2O$/ml)
0.5 ml acetylacetone
($H_2O$ + HF) = 4.0 ml.

Figure 3:
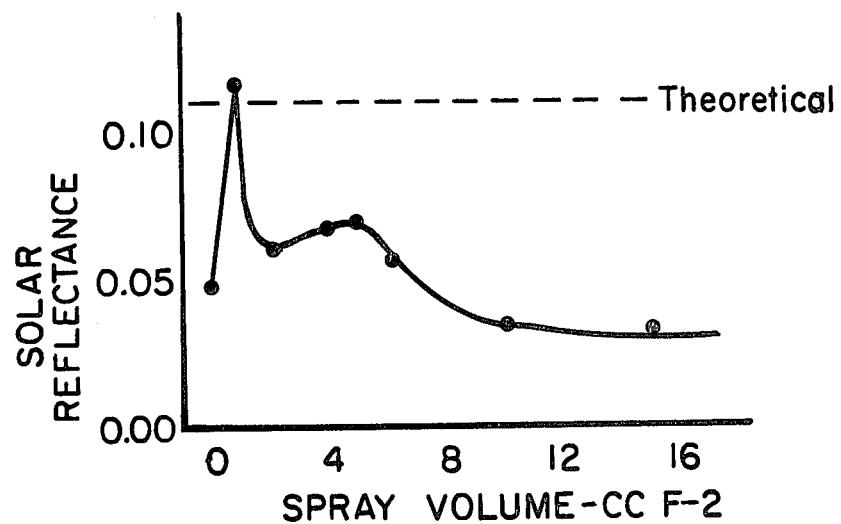
FIG. 3 is a plot of solar reflectance of tin oxide vs. spray volume of solution.

FIG. 3 illustrates a comparison of an F2 composition for coating 14 which is adapted to act as an emissivity suppressor over an absorber (See F-2 in Ex. 7) with the theoretical minimum solar reflectance for a tin oxide system. The fluorine reduces the theoretical minimum by one half. The significance of FIG. 3 is that for thicker coatings (see Table I), the fluorine system acts as an antireflection coating in the solar region and as an infrared reflector thus suppressing emissions.

Figure 4:
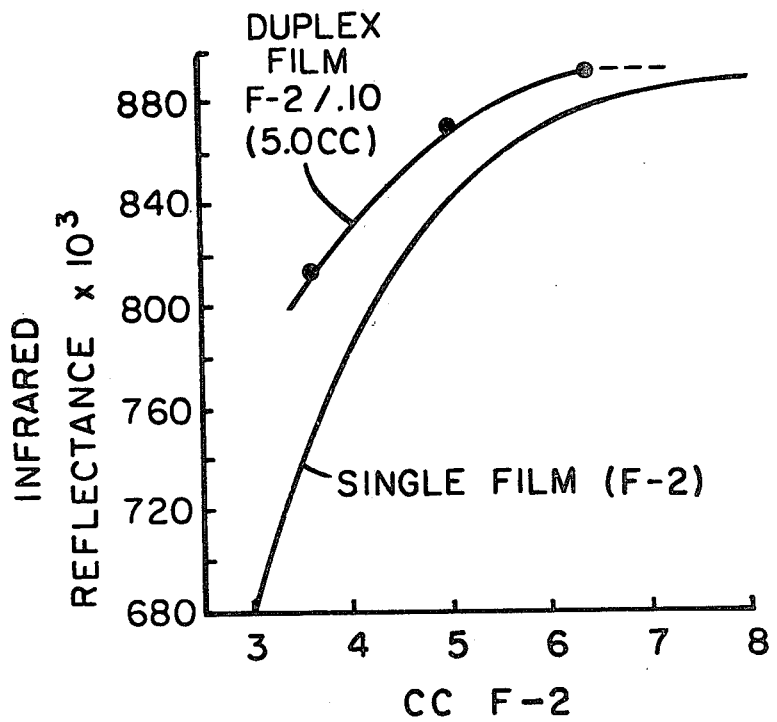
FIG. 4 plots reflectivity of a composite fluorine duped tin oxide coating from Example 7 vs. film thickness in terms of volume and compares a plot of reflectivity for a composite film.

See FIG. 4 for the relation between a single coating (F-2) and a composite coating of the 0.10 film of Ex. 1Ai and F-2 above. It is clear that the composite coating reduces materials requirements, i.e., volume of solution for the same infrared reflectance. That is to say emissivity is suppressed in the infrared to a higher degree using less material.

In Example 5 it was shown that the composite coating can be used to produce both the heat mirror type coatings as illustrated in Examples 1–4 and also the tandem absorber reflector coating wherein the reflector "looks through" the absorber to suppress infrared radiation. In Example 6 it was shown that film thickness can be reduced while still maintaining high absorptance and low emissivity, and in Example 7 other materials such as fluorine, also described in Example 3 could be used to enhance the desired emissivity characteristic and reduce materials requirements as well as surprisingly reduce solar reflectance. It should also be appreciated from the foregoing that iron compositions could be combined with the coatings described to take advantage of their relatively low cost and availability.

While there have been described what are at present to be considered the preferred embodiments of the present invention, it will be obvious to those skilled in the art that various changes and modifications may be made therein without departing from the invention and it is intended in the appended claims to cover all such changes and modifications as fall within the true scope and spirit of the invention.

I claim:

1. A composite coating for a solar collector absorber wherein solar radiation impinges on one surface of the absorber, and said absorber is adapted to transfer energy so received from the impinging solar radiation in the form of sensible heat to a working fluid in communication with a delivery surface of the absorber comprising;
   a smooth surface absorber substrate;
   a first coating of solar radiation absorbing metal oxides, said metal oxides selected from a group consisting of antimony doped tin oxide, tin doped indium oxide and iron oxide; and a second coating of infrared radiation reflecting metal oxides, said second coating metal oxides selected from a group consisting of antimony doped tin oxide, fluorine doped tin oxide and tin doped indium oxide, said first and second coatings being deposited so as to form a composite on at least one of the other and the substrate in an order of deposition such that the first coating lies in back of the second coating with respect to impinging solar radiation such that the composite exhibits an absorptivity characteristic $\alpha$ of at least 0.85 for the solar radiation range of about 0.2 to about 2.0 micrometers and an emissivity characteristic of less than 0.2 for energy in the infrared range of about 2.0 to about 20 micrometers.

2. The composite coating of claim 1 wherein said first coating of antimony doped tin oxide is prepared from a solution consisting of a mixture of antimony and tin oxides in a ratio of about 10 to about 1 of tin to antimony metals and having an absorptivity of at least 0.85.

3. The composite coating of claim 1 wherein said second coating of antimony doped tin oxide consists essentially of antimony and tin oxides in a weight ratio of about 100:1 of tin and antimony metals and having a maximum emissivity of 0.2.

4. The composite coating of claim 1 wherein said second coating of tin doped indium oxide is prepared from a solution consisting essentially of tin and indium oxides in a weight ratio of about 32:1 of indium to tin metals and having a maximum emissivity characteristic of about 0.13.

5. The composite coating of claim 1 wherein said second coating of fluorine doped tin oxide is prepared from a solution consisting essentially of fluorine and tin oxide in a ratio of about 40:1 tin to fluorine and has a maximum emissivity characteristic of about 0.13.

6. The composite coating of claim 1 wherein the first and second coatings are deposited in volumes of about 0.3 to about 0.5 cc per square inch.

7. A composite coating for a solar collector absorber wherein solar radiation impinges on one surface of the absorber, and said absorber is adapted to transfer energy so received from the impinging solar radiation in the form of sensible heat to a working fluid in communication with a delivery surface of the absorber comprising:
   a smooth surface absorber substrate;
   a first coating of infrared reflecting metal oxides deposited on said smooth layer, said metal oxides consisting of iron oxide having an iron to oxygen ratio of about 1.6:1 minimum and a second coating of metal oxides deposited on the first coating consisting of iron oxide having an iron to oxygen ratio of about 0.75:1, said first and second coatings respectively exhibiting a low emissivity characteristic $\epsilon$ of about 0.08 for infrared radiation in the wavelength range from about 2.0 to about 20 micrometers and a high solar radiation absorptivity characteristic $\alpha$ of about 0.93 for solar radiation in a range of about 0.2 to about 2.0 micrometers.

* * * * *

UNITED STATES PATENT AND TRADEMARK OFFICE
CERTIFICATE OF CORRECTION

PATENT NO. : 4,286,009
DATED : August 25, 1981
INVENTOR(S) : Edward M. Griest

It is certified that error appears in the above-identified patent and that said Letters Patent are hereby corrected as shown below:

Column 4, line 45, "E" should read --$\varepsilon$--.

Signed and Sealed this

First Day of June 1982

[SEAL]

Attest:

GERALD J. MOSSINGHOFF

Attesting Officer

Commissioner of Patents and Trademarks